(12) United States Patent
Inagaki

(10) Patent No.: US 7,360,550 B2
(45) Date of Patent: Apr. 22, 2008

(54) SYSTEM FOR RECYCLING SPENT SULFURIC ACID, METHOD FOR RECYCLING SPENT SULFURIC WASTE LIQUID, AND RECYCLED SULFURIC ACID

(75) Inventor: Yasuhito Inagaki, Kanagawa (JP)

(73) Assignee: Sony Corporation (JP)

(*) Notice: Subject to any disclaimer, the term of this patent is extended or adjusted under 35 U.S.C. 154(b) by 286 days.

(21) Appl. No.: 10/478,311

(22) PCT Filed: Apr. 4, 2003

(86) PCT No.: PCT/JP03/04355

§ 371 (c)(1),
(2), (4) Date: May 17, 2004

(87) PCT Pub. No.: WO03/084868

PCT Pub. Date: Oct. 16, 2003

(65) Prior Publication Data

US 2004/0211464 A1    Oct. 28, 2004

(30) Foreign Application Priority Data

Apr. 5, 2002  (JP) ............................. 2002-104409
Aug. 8, 2002  (JP) ............................. 2002-231881

(51) Int. Cl.
*G05D 11/08*  (2006.01)
*C01B 17/90*  (2006.01)

(52) U.S. Cl. ........................... 137/3; 137/93; 423/531; 423/DIG. 2

(58) Field of Classification Search ................... 137/3, 137/5, 8, 93; 423/531, DIG. 2
See application file for complete search history.

(56) References Cited

U.S. PATENT DOCUMENTS

| | | | | | |
|---|---|---|---|---|---|
| 3,856,673 | A | * | 12/1974 | De La Mater et al. | 210/750 |
| 4,357,196 | A | | 11/1982 | Tanaka et al. | |
| 4,483,357 | A | * | 11/1984 | Rao et al. | 137/3 |
| 5,032,218 | A | * | 7/1991 | Dobson | 203/40 |
| 5,527,985 | A | * | 6/1996 | Funken et al. | 588/309 |
| 6,782,901 | B2 | * | 8/2004 | Yasuda et al. | 134/107 |
| 2002/0108643 | A1 | * | 8/2002 | Yasuda et al. | 134/107 |

FOREIGN PATENT DOCUMENTS

| | | |
|---|---|---|
| JP | 52-127496 | 10/1977 |
| JP | 61-297407 | 12/1986 |
| JP | 8-091811 | 4/1996 |
| JP | 11-157812 | 6/1999 |
| JP | 2001-350879 | 12/2001 |

* cited by examiner

Primary Examiner—Stephen M. Hepperle
(74) Attorney, Agent, or Firm—Lerner, David, Littenberg, Krumholz & Mentlik, LLP

(57) ABSTRACT

A system for recycling spent sulfuric acid, wherein spent sulfuric acid is effectively utilized at a place other than a discharge source regardless of geographical conditions, and a method for recycling waste sulfuric acid. In the system, when spent sulfuric acid that is discharged or collected at a discharge source is transported by a carrier unit and used at a user office a concentration of the spent sulfuric acid is measured and/or adjusted at least at one of the discharge source, the carrier unit, and the user office. The spent sulfuric acid waste liquid that is discharged or collected at the discharge source is reutilized by being mixed with at least one of a hydrogen peroxide solution and water.

7 Claims, 8 Drawing Sheets

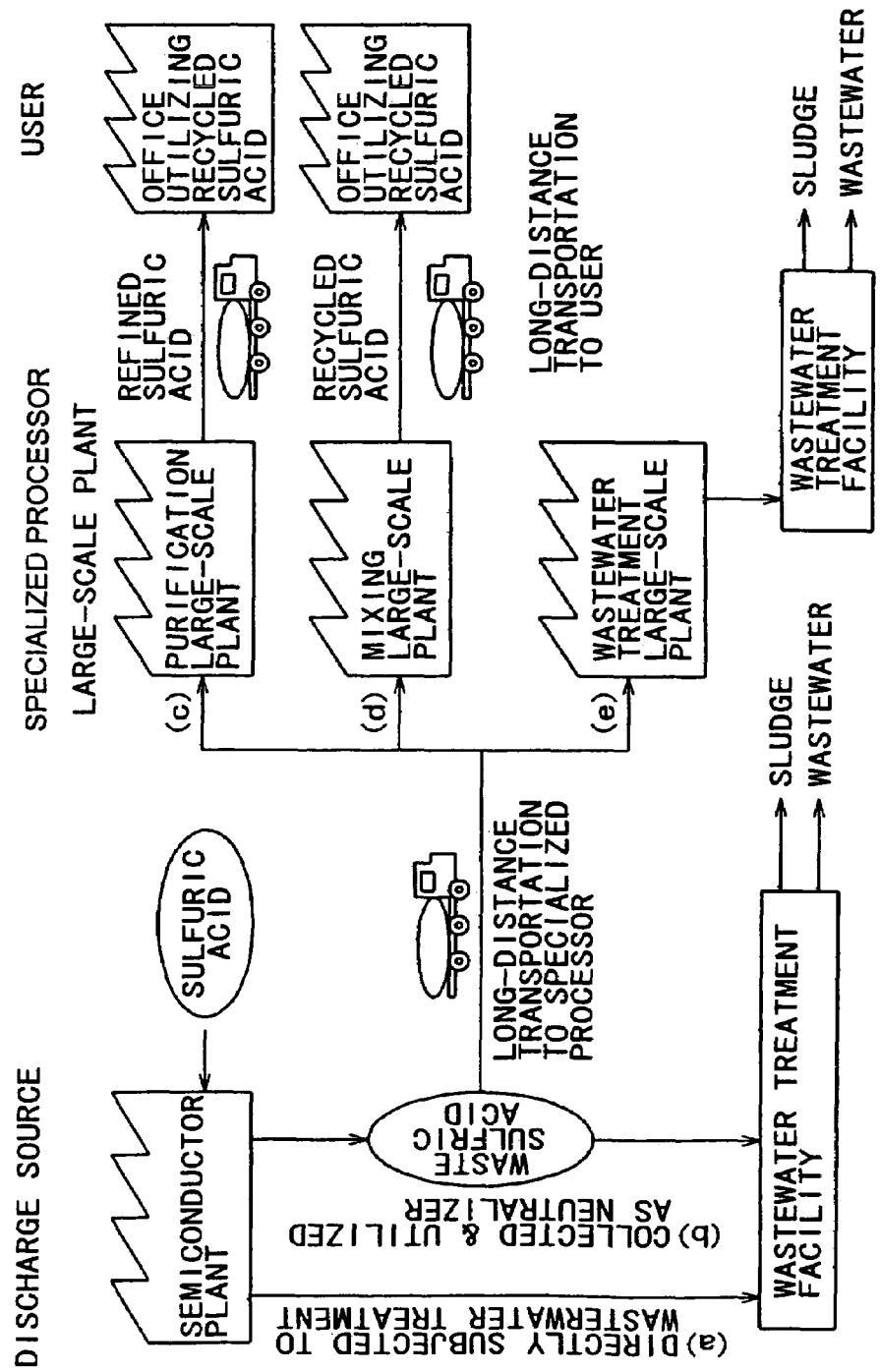
F I G. 3

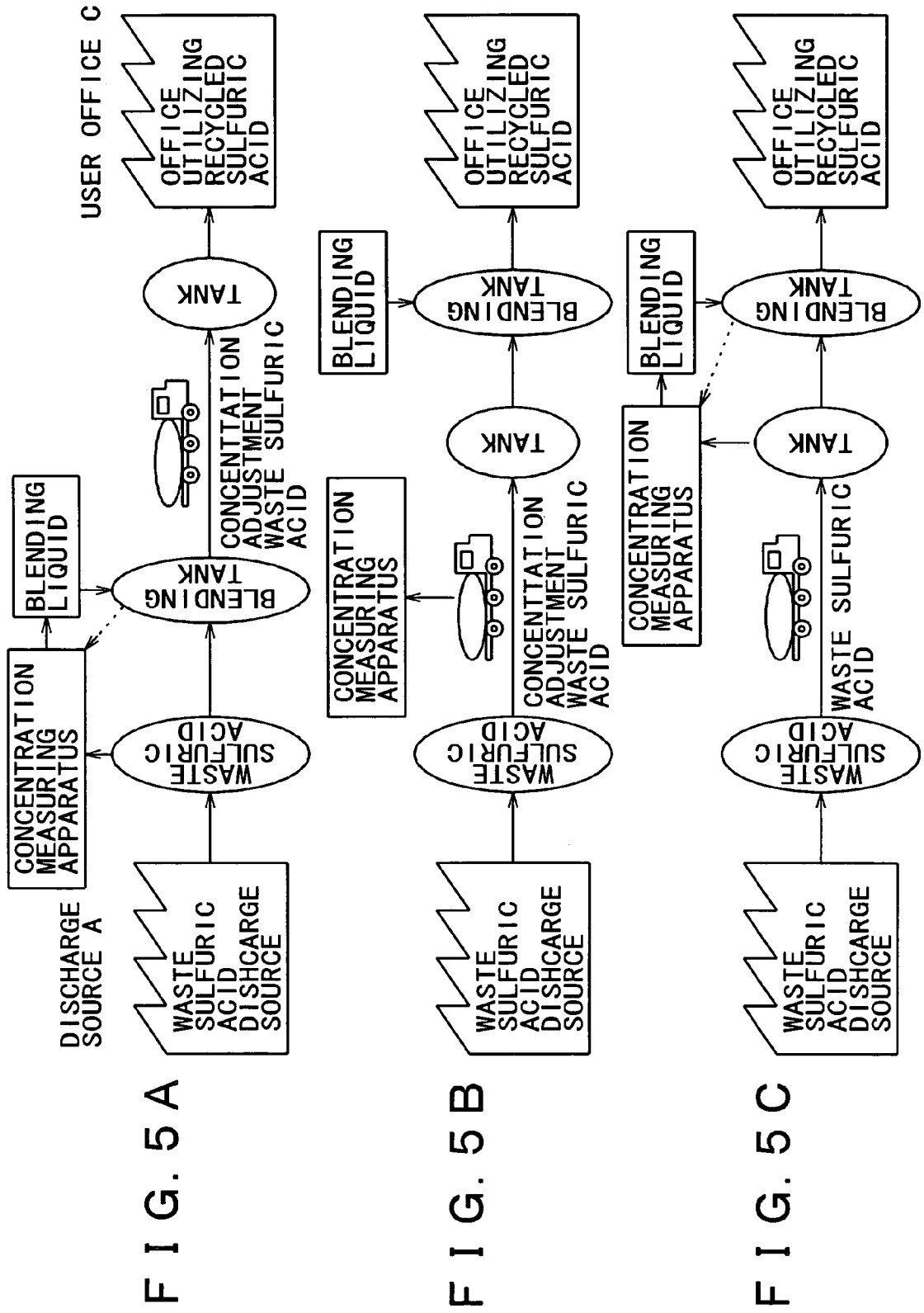

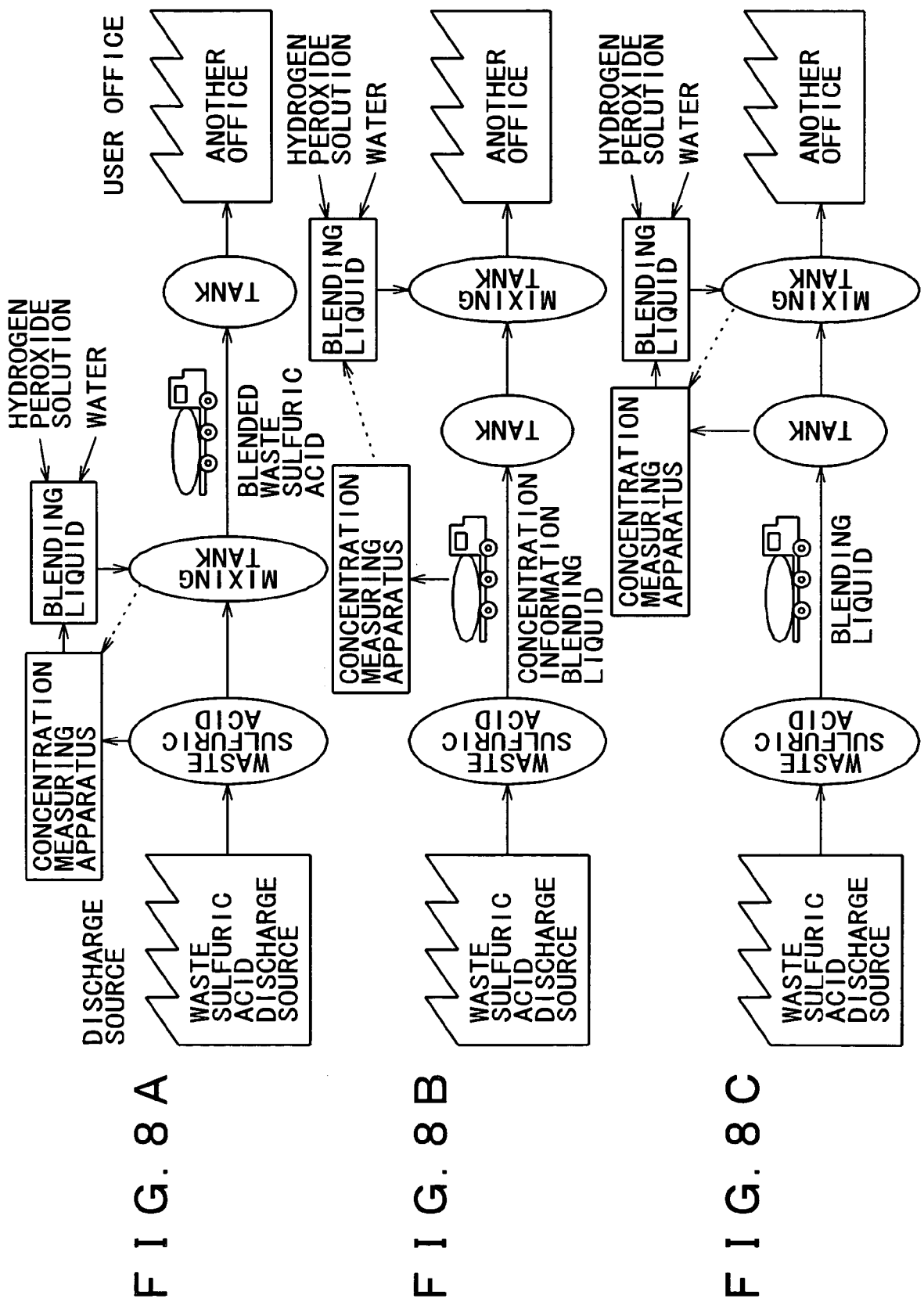

SYSTEM FOR RECYCLING SPENT SULFURIC ACID, METHOD FOR RECYCLING SPENT SULFURIC WASTE LIQUID, AND RECYCLED SULFURIC ACID

TECHNICAL FIELD

The present invention relates to a system for recycling spent sulfuric acid, to recycled spent sulfuric acid, to a method for recycling spent sulfuric acid, and to recycled sulfuric acid.

BACKGROUND ART

Sulfuric acid is utilized in large quantity in various kinds of industries with a grade (at a purity or a concentration) determined according to purposes of the industries. In the case that such sulfuric acids are spent, various methods for recycling the sulfuric acids have been proposed (in Japanese Patent Application Publication Laid-Open Nos. 9-315806, and 2002-68715, and so on), and, currently, the following processes are commonly performed.

(1) Wastewater treatment (or neutralization treatment) is performed thereon in a generating plant.

(2) A specialized processor picks up (or collects) spent sulfuric acids and performs wastewater treatment thereon.

(3) Spent sulfuric acids are utilized in a plant as a neutralizer.

(4) Sulfuric waste liquid is recycled (or subjected to distillation purification) in a plant or by a specialized recycler.

(5) Spent sulfuric acid is taken over to a specialized recycler, and utilized as a material of alum (or aluminium sulfate) (incidentally, in this case, the usage rate of spent sulfuric acid is equal to or less than 10%).

(6) Spent sulfuric acid is collected by a specialized recycler, and is resold to other users by mixing with virgin sulfuric acid.

In the above case (1), sulfuric acid itself is a strongly acidic powerful drug and therefore cannot be discarded as it is, and neutralization treatment by using a large amount of neutralizer, such as alkali (for example, slaked lime or the like), or coagulation-sedimentation treatment or hydrogen peroxide removal treatment by using various wastewater treatment agents (for instance, inorganic coagulant, polymer coagulant, or hydrogen peroxide decomposition accelerator) is required, and resultantly a large amount of sludge and wastewater are to be generated. Regarding the above case (2), it is the same with the case (1), except that the treatment is performed on the spent sulfuric acids outside a plant. In the above case (3), a demand for using the spent sulfuric acid as the neutralizer is small, and consequently, the same treatment as required in the case (1) is needed for treating a surplus part of the spent sulfuric. In the case (4), a huge plant and energy are needed for recycling the spent sulfuric acid, and the recycling thereof is largely affected by the location (or site condition) of the plant, so that a target area therefor is limited only to a partial restricted area. Moreover, the provision of recycling equipment in a generating plant is fraught with many problems in energy, cost, site area, safety, and handling thereof and thus impractical and hardly in common use. In the above case (5), waste sulfuric acid is seldom treated as a valuable resource, and usually, the waste sulfuric acid is taken over at charge or sold at a low price (several yen per kilograms). The waste sulfuric acid is transported by way of a path from a discharge source to a user through a specialized recycler, so that a transportation distance is elongated, and similarly with the above case (4), the utilization is largely affected by the location (or site condition). Similarly, in the above case (6), the spent sulfuric acid is transported by way of a path from a discharge source to a user through a specialized recycler. Thus, the transportation distance is elongated and the mixture is susceptible to the location (or site condition).

As described above, according to the prior art, the recycling of spent sulfuric acid is susceptible to the location of a specialized recycler that practices collection/takeover of spent sulfuric acid. Therefore, generally, in a case where no specialized recyclers are present in the vicinity of an own plant, wastewater treatment is performed in the own plant, and the recycling of spent sulfuric acid has not fully been established. According to the prior art, an added-value of spent sulfuric acid is low, and accordingly, wastewater treatment is usually performed by the above process (1) or (2) in general. Alternatively, the spent sulfuric acid is treated by being delivered to outsiders for value. However, it is obvious from the viewpoint of environment protection countermeasures that environmental destruction is increasingly promoted by repeating a treatment process, which is seen in the above case (1) or (2) and uses a large amount of chemicals to thereby generate large amounts of sludge and wastewater.

Thus, there has been an increasing demand for developing techniques related to a method of recycling spent sulfuric acid, and each office advances development directed to simplification and energy-saving of the method and equipment for performing the method. For example, a method of introducing sulfurous acid to spent sulfuric acid thereby to decompose a residual hydrogen peroxide solution and to generate sulfuric acid (see Japanese Patent Application Publication Laid-Open No. 9-135806) and a method of supplying spent sulfuric acid to an electrolytic cell constituted by anion-exchange membrane and cation-exchange membrane thereby to concentrate sulfuric acid and to generate oxidant (see Japanese Patent Application Publication Laid-Open No. 5-139707) have been studied in each office that undertakes various efforts directed to scaling-down of a plant and to energy-saving. However, these techniques have faced many problems in cost and so on. Thus, it cannot be said that a practical method of recycling spent sulfuric acid has fully been established.

An object of the invention is to provide an industrially advantageous new system featuring that spent sulfuric acid is effectively utilized at a place other than a discharge source regardless of geographical conditions.

Further, another object of the invention is to provide a system which is able to recycle spent sulfuric acid, without being equipped with a large-scale facility, at low cost by supplying the spent sulfuric acid to an appropriate user according to the necessary purity and amount thereof and by recycling the supplied acid.

Furthermore, further another object of the invention is to provide an industrially advantageous recycling method featuring that sulfuric waste liquid discharged from a certain office is effectively utilized by mixing the waste liquid with at least one of a hydrogen peroxide solution and water to thereby add a value to the sulfuric waste liquid, and to provide value-added recycled sulfuric acid.

Moreover, still another object of the invention is to provide a method enabled to recycle spent sulfuric acid at low cost without setting up a large-scale facility.

DISCLOSURE OF THE INVENTION

As a result of conducting diligent studies to achieve the foregoing objects, the present inventors have found that for the purpose of effectively utilizing spent sulfuric acid, which is discharged/collected at a certain office, at another office, by measuring and adjusting a concentration of the spent sulfuric acid at least at one of a spent sulfuric acid generating office, a spent sulfuric acid transporter, and a spent sulfuric acid utilizing office, it becomes possible to effectively utilize the spent sulfuric acid with having little effect of a location. The inventors have accomplished the invention by conducting various additional studies.

Further, the inventors have found that for the purpose of effectively utilizing spent sulfuric acid, which is discharged and/or collected at a certain office, the spent sulfuric acid can be utilized as recycled sulfuric acid by mixing at least one of a hydrogen peroxide solution and water into the spent sulfuric acid. The inventors have completed the invention by conducting various additional studies.

BRIEF DESCRIPTION of DRAWINGS

FIG. 3 is a view illustrating a flow of conventional treatment of spent sulfuric acid.

FIG. 5 is a view illustrating other modes of the system for recycling spent sulfuric acid according to the invention.

FIGS. 8A to 8C are views respectively illustrating other modes of the method of recycling spent sulfuric acid according to the invention.

BEST MODE FOR CARRYING OUT THE INVENTION

Figure 1:
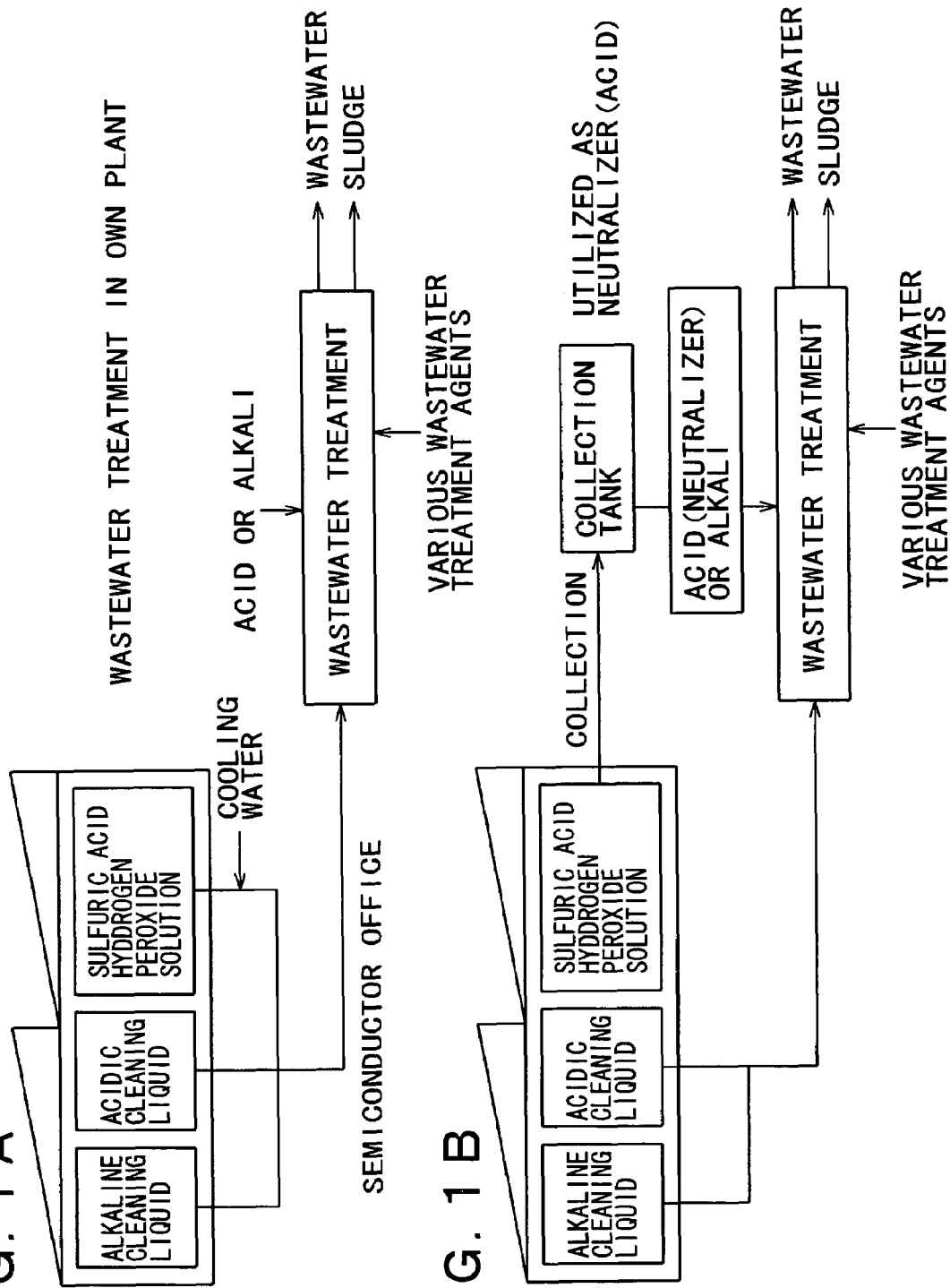
FIGS. 1A and 1B are views each illustrating a flow of conventional treatment of spent sulfuric acid waste liquid.

There is no particular limitation on the concentration of spent sulfuric acid to be treated according to the invention, however, spent sulfuric acid of higher concentration is more preferable for cutting down the transportation cost per unit weight of pure sulfuric acid to a low level in order to improve the practicality of the invention, because the higher the concentration of spent sulfuric acid is, the higher the efficiency in transporting the spent sulfuric acid becomes. Further, sulfuric acid waste liquid, in which a hydrogen peroxide solution is mixed, is more preferable. It is because the facts that hydrogen peroxide used for sterilizing and deodorizing medical instruments is a strong oxidizing agent, and that a mixture solution obtained by mixing a hydrogen peroxide solution into sulfuric acid, which is oxidizing strong acid, has a very strong oxidizing force and can oxidize, dissolve, and eliminate organic and inorganic materials, and also can be expected to be used as various kinds of cleaning liquid. From the above-mentioned viewpoints, sulfuric acid waste liquid discharged from a semiconductor office is preferable as the sulfuric waste liquid suitable for the present invention for the following reason. That is, the semiconductor office utilizes a mixture solution obtained by mixing strong sulfuric acid, which has a low content of impurities, with a hydrogen peroxide solution as a cleaning solution in a semiconductor manufacturing process. Thus, sulfuric acid waste liquid, which is high in concentration and purity and contains a hydrogen peroxide solution, can be obtained by collecting spent sulfuric acid waste liquid without change.

As above-mentioned, sulfuric acid waste liquid mixed with hydrogen peroxide, which is generated in the semiconductor office, is usually wastewater-treated or utilized as a neutralizing agent in a plant. Sometimes, sulfuric acid waste liquid mixed with a hydrogen peroxide solution is utilized outside the plant as a material of alum. However, the hydrogen peroxide solution mixed therein is not effectively utilized. This is merely cascade utilization of the sulfuric acid waste liquid mixed with hydrogen peroxide (simply as an alternative of industrial sulfuric acid), because it is a demerit that a hydrogen peroxide solution is mixed into the sulfuric acid waste liquid to thereby considerably lower the added-value of the sulfuric acid waste liquid.

According to the invention, the addition of hydrogen peroxide solution and/or water to the sulfuric acid waste liquid is performed so that the hydrogen peroxide solution has a predetermined concentration. Thus, hydrogen peroxide already contained in the waste liquid causes no trouble. On the contrary, the invention is advantageous in that a quantity of hydrogen peroxide solution to be added is reduced by an amount of residual hydrogen peroxide solution in the waste liquid.

Sulfuric acid waste liquid having a high concentration, which is discharged from the semiconductor office, is preferable, because the higher the concentration thereof, that is, the lower the content of impurity is, the larger an amount of reusable matter becomes, but usually, a sulfuric acid content ranges from 50 weight percent to 98 weight percent. More generally, the sulfuric acid content ranges from 65 weight percent to 90 weight percent. Further, the content of hydrogen peroxide contained in the sulfuric acid waste liquid ranges from 0 to 6 weight percent. More generally, the content thereof ranges from 0.1 weight percent to 3 weight percent. Further, demands for purity of sulfuric acid for electronic industry have become stringent along with miniaturization and high densification of semiconductor devices. It is demanded that the content of, for example, metal ingredients is equal to or less than 20 ppb. Therefore, preferably, the level of the purity of sulfuric acid is so high that the contents of various kinds of impurities contained in the sulfuric acid waste liquid, for instance, the content of metal ingredient is less than 10 ppb, and the content of chloride is less than 0.1 ppm. This enables that the sulfuric acid waste liquid is used as cleaning liquid in an office other than the semiconductor office. For example, the sulfuric acid waste liquid can be used as photoresist mask peeling liquid in a cathode-ray tube manufacturing office, and as copper-foil etching liquid in a circuit-board manufacturing office. In each of theses cases, an aqueous mixture solution of low-concentration sulfuric acid (having a concentration ranging from a few tenths weight percent to 40 weight percent) and a low-concentration hydrogen peroxide solution (having a concentration ranging from several hundredths weight percent to 40 weight percent). Therefore, it is more preferable to utilize the sulfuric acid waste liquid mixed with hydrogen peroxide, which is discharged from the semiconductor office, for these uses.

An office A discharging sulfuric acid waste liquid according to the invention is not particularly limited, as long as the office A discharges sulfuric acid waste liquid having a high sulfuric acid content and a low impurity content. Such offices A are, for example, plants or offices in various industries, such as electric/electronic industries, which include a semiconductor industry, iron and steel industries, an inorganic drug industry, an organic drug industry, a medicine industry, a textile industry, a fertilizer industry, a metal industry, a mining industry, a paper manufacturing industry, a soda industry, a machine industry, a storage battery industry, and a neutralizing gypsum industry. Among these industries, semiconductor, drug, medicine, and chemical industries are preferable. Especially, judging from the facts that the content of impurities, such as heavy metals, in spent sulfuric acid waste liquid discharged from a semiconductor office is low (at levels of the order of ppm to ppt), and that a sulfuric acid content thereof is equal to or more than 60 weight percent, and from the quality, purity, and safety of sulfuric acid waste liquid, preferably, the office A is a semiconductor office or a plant.

An office C utilizing sulfuric acid waste liquid, which is to be included in the invention, is not particularly limited. Such offices C are, for example, plants or offices in various industries, such as electric/electronic industries (including a cathode-ray tube office and a circuit-board office), and iron and steel industries, an inorganic drug industry, an organic drug industry, a medicine industry, a textile industry, a fertilizer industry, a metal industry, a mining industry, a paper manufacturing industry, a soda industry, a machine industry, a storage battery industry, and a neutralizing gypsum industry. Among the plants or the offices in these industries, the plants or the offices in the electric/electronic industries (including a cathode-ray tube office and a circuit-board office), the chemical industry, the machine industry, or the iron and steel industries. Especially, plants or offices in the electric/electronic industries including a cathode-ray tube office and a circuit-board office), are preferable. Practical examples of these are a cathode-ray tube office and a circuit-board office. At these offices, a dilute mixture aqueous solution of sulfuric acid and hydrogen peroxide solution is utilized as the photoresist mask peeling liquid and as copper-foil peeling liquid. The concentration of sulfuric acid contained in the mixture solution is usually equal to or less than 50 weight percent. This is preferable for reutilizing spent sulfuric acid discharged from the office A.

A carrier unit B moving sulfuric acid waste liquid, which is to be included in the invention, is not particularly limited. Such carrier units B are, for example, vehicles (for instance, a tank truck, and a truck), ships (for example, a tanker, and a ferry), freight trains, airplanes (or an air freighter). Among these units, the vehicles and the ships are more practical. Especially, the tank truck and the truck (a medicine container that transports medicine) easily make access to the user office C from the discharge source office A. Thus, the applicable ranges of the tank truck and the truck are wider than other transportation means.

The spent-sulfuric-acid recycling system according to the invention features that the concentration of spent sulfuric acid is measured and/or adjusted at least at one of the discharge source A, the carrier unit B, and the user office C. Especially, it is preferable that the concentration of spent sulfuric acid is adjusted according to a result of measuring the concentration of the spent sulfuric acid.

Means for measuring the concentration of spent sulfuric acid, which is to be included in the invention, is not particularly limited, and may be included the following means. That is, at least one kind of means for measuring a refractive index, means for performing neutralization titration, means for measuring moisture content (according to a Karl Fischer's method, or what is called an evaporated residue method), means for measuring absorbance, means for measuring specific gravity, means for measuring viscosity, means for measuring pH, and means for performing potentiometric titration is used, so that the concentration of spent sulfuric acid can be measured. Among these means, from the viewpoints of measurement speed and accuracy, and the price and size of a measuring instrument, and handling ability, the means for measuring a refractive index, the means for measuring specific gravity, and the means for measuring pH are more preferable. The above-mentioned concentration measurement may be performed at any one of the discharge source A, from which spent sulfuric acid is discharged, the carrier unit B transporting the spent sulfuric acid, and the user office C utilizing the spent sulfuric acid, alternatively, at two or more of the discharge source, the carrier unit, and the user office. A reference value for concentration adjustment (to be described later) is obtained by performing the concentration measurement in this way. Further, even when concentration adjustment is not performed, the presentation of a result of the concentration measurement to the user office C leads to assurance of the quality of recycled sulfuric acid. Furthermore, the price of spent sulfuric acid can be determined according to a result of the measurement of the concentration of the spent sulfuric acid.

The concentration adjustment to be included in the invention may be performed in either of the cases that the concentration of the spent sulfuric acid is increased, and that the concentration thereof is decreased. However, it is more general that the concentration thereof is adjusted by being decreased to a lower value. To increase the concentration thereof, sulfuric anhydride or fuming sulfuric acid is added thereto. Further, the adjustment of the concentration thereof to a lower value is enabled by adding water or purified water thereto. Incidentally, methods of adjusting the concentration of spent sulfuric acid to a predetermined value are a method of adding a constant amount (per volume or per weight) of concentration adjustment liquid (sulfuric anhydride, fuming sulfuric acid, water, purified water, and so forth) to spent sulfuric acid, and a method of adding a predetermined amount of concentration adjustment liquid thereto according to a result of the concentration measurement. From the viewpoint of quality control, the latter method is more preferable. The above-mentioned concentration adjustment may be performed at any one of the discharge source A, the carrier unit B, and the user office C, alternatively, at two or more of the discharge source, the carrier unit, and the user office.

The concentration measurement and the concentration adjustment may be performed either at the same place or at different places. In the case that the concentration measurement and the concentration adjustment are performed at the same place, a result of the concentration measurement is directly sent to a concentration adjustment apparatus (concentration adjustment liquid, a concentration adjustment liquid storing tank, an adjustment liquid supply pump, a blending tank, a concentration measuring apparatus provided in the blending tank and so forth) in the form of a signal. Thus, the concentration can automatically be adjusted to a predetermined value. On the other hand, in the case that the concentration measurement and the concentration adjustment are performed at different places, a result of the concentration adjustment can be transmitted to the next step by various means, such as orality, telephones, mails, and the Internet. It is judged at a place, to which the result of the measurement is transmitted, according to the transmitted result whether spent sulfuric acid is used without change, or the concentration adjustment is performed. When the concentration adjustment is performed, the concentration adjustment liquid is added in such a way as to obtain a desired concentration, as above-mentioned. Incidentally, in the concentration adjustment tank, the concentration measuring apparatus may be installed so as to check whether the concentration of the spent sulfuric acid reaches a predetermined value after the concentration adjustment liquid is added thereto.

According to the invention, an additional treatment other than the measurement and/or the adjustment of the concentration of the spent sulfuric acid may be performed at least at one of the discharge source A, the carrier unit B, and the user office C. The additional treatment, which will be described in detail below, is, for instance, a treatment of concentrating sulfuric acid contained in the spent sulfuric acid, a treatment of removing ingredients other than sulfuric acid, which are contained in the spent sulfuric acid, or a treatment of adding another ingredient other than the sulfuric acid, which is contained in the spent sulfuric acid, thereto.

The treatment of concentrating sulfuric acid contained in the spent sulfuric acid has been cited as exemplifying the additional treatment. Known means may be used for performing the treatment of concentrating sulfuric acid. For example, in the case where the ingredients, which are other than sulfuric acid and contained in the spent sulfuric acid, are materials, such as water and hydrogen peroxide solution, which are lower in boiling point than sulfuric acid, the ingredients are evaporated faster than sulfuric acid by heating the spent sulfuric acid. Consequently, the sulfuric acid contained in the spent sulfuric acid can be concentrated. At that time, the evaporated ingredients are removed from a reaction system by using a suction unit. Thus, sulfuric acid can quickly be concentrated, as compared with a case that the gaseous ingredient is discharged by natural diffusion. A heating temperature, to which the spent sulfuric acid is heated in such a treatment, depends on the ingredients contained in the spent sulfuric acid, which are other than sulfuric acid. Therefore, although the heating temperature cannot generally be determined, for example, in the case where the spent sulfuric acid contains water and hydrogen peroxide solution, the heating temperature ranges from about 150° C. to about 315° C., preferably, about 180° C. to about 250° C. A reaction apparatus used for the treatment is not particularly limited. A known apparatus may be used as the reaction apparatus. This apparatus is, for instance, an apparatus that is made of a material showing corrosion-resistance against spent sulfuric acid under concentrating conditions, and enabled to temporarily store the spent sulfuric acid, and that has a supply port from which the spent sulfuric acid is supplied, a discharge portion from which concentrated solution is taken out, a heating device for heating spent sulfuric acid, an exhaust port from which the gaseous ingredient obtained by evaporation is exhausted, and a suction unit connected to the exhaust port as an option. More specifically, an example of an apparatus for concentrating sulfuric acid contained in the spent sulfuric acid, in which the sulfuric acid is mixed with hydrogen peroxide solution, is an apparatus described in Japanese Patent Application Publication Laid-Open No. 2002-68715.

Further, the treatment of removing ingredients other than sulfuric acid contained in the spent sulfuric acid has been cited as exemplifying the additional treatment. Specifically, spent sulfuric acid discharged in the technical field of metal plating frequently contains metal ions. Thus, a treatment of eliminating such metal ions can be cited as exemplifying the treatment of removing ingredients other than sulfuric acid. A treatment of using anion-exchange membrane and separating metal ions from a solution, which contains acid and metal, by utilizing a concentration difference therebetween as a driving force to thereby that is, what is called diffusion dialysis is cited as exemplifying the treatment of eliminating the metal ions. Many documents and patents concerning membrane for performing diffusion dialysis on acid are reported. Anion-exchange membrane obtained by amination of (or introduction of quaternary-pyridinium groups to) chlormethyl-styrene (or vinyl pyridine)-divinylbenzene copolymer is the most practical and useful.

Treatments of removing only hydrogen peroxide solution from spent sulfuric acid containing the hydrogen peroxide solution are cited as exemplifying the treatment of removing ingredients other than sulfuric acid contained in the spent sulfuric acid. More specifically, a treatment of decomposing hydrogen peroxide by simultaneously supplying hydrogen to a hydrogen peroxide decomposing catalyst (see Japanese Patent Application Publication Laid-Open No. 61-186208), and a treatment of decomposing hydrogen peroxide by letting waste liquid, whose temperature is raised, through a carbonaceous material (see Japanese Patent Application Publication Laid-Open No. 5-345188) are cited. Moreover, a treatment of introducing sulfurous acid into spent sulfuric acid, which contains hydrogen peroxide solution, and causing the hydrogen peroxide and the sulfurous acid to react with each other thereby to decompose hydrogen peroxide and to produce sulfuric acid, and preventing sulfurous acid by detecting the sulfurous acid from excessively being added thereto, and then eliminating residual sulfurous acid by aerating the spent sulfuric acid after the introduction of the sulfurous acid is stopped (see Japanese Patent Application Publication Laid-Open No. 9-315806).

An additional ingredient other than sulfuric acid may be added to the spent sulfuric acid according to a purpose for using at a user office C. The additional ingredient is not particularly limited. Hydrogen peroxide solution is cited as exemplifying the additional ingredient, because sulfuric acid containing hydrogen peroxide solution is frequently used as an etching agent, and as a surface treatment agent, and so on, for manufacturing a semiconductor, and a printed circuit board, and for performing surface treatment on various metals.

The added value of spent sulfuric acid, which has hitherto been not effectively utilized, or which has been sold at low price, can be dramatically increased (as that of a valuable resource) by using the above-mentioned method. There are three modes of selling spent sulfuric acid are a case that a result of measuring the concentration is transmitted to a purchaser without changing the spent sulfuric acid, a case that the spent sulfuric acid, to which concentration adjustment liquid is added (incidentally, the concentration thereof is indefinite after the concentration adjustment liquid is added), is sold, and a case that the spent sulfuric acid, to which concentration adjustment liquid is added, is sold by adjusting the concentration thereof to a predetermined value (incidentally, the value of the concentration is checked). When the spent sulfuric acid is soled, volume (or capacity) or weight thereof may be employed as a basis for sales. Alternatively, the spent sulfuric acid may be sold according to a result of the concentration measurement by using the content of pure sulfuric acid as the basis for sales. When the spent sulfuric acid is sold as it is, that is, without performing the concentration adjustment, the concentration of the spent sulfuric acid varies at the discharge source. Therefore, it is more rational (or quantitative) to sell the spent sulfuric acid on the basis of the pure sulfuric acid content.

A system for recycling spent sulfuric acid according to the invention can repeat the treatment a plurality of times. That is, sulfuric acid recycled by the system for recycling spent sulfuric acid according to the invention may be provided thereto again. More specifically, circulation of the recycling, which is represented by the next expression: Discharge Source A→Carrier unit B→User Office C (=Discharge Source A'→Carrier unit B'→User Office C')n (in the expression, "n" designates a natural number, preferably, a natural number ranging from 1 to 7, and incidentally, in the case that "n" is equal to or larger than 2, A', B', and C', which correspond to a different value of "n", may be either the same as or differ from A, B, and C, respectively.

The system for recycling spent sulfuric acid according to the invention may have the following mode. That is, the system cited herein has a terminal of the discharge source A, a terminal of the user office C, and a spent sulfuric acid information management unit connected to the terminals through a network. The system comprises (a) means for inputting information on spent sulfuric acid, (b) means for storing the information on the spent sulfuric acid, (c) means for inputting conditions concerning spent sulfuric acid to be supplied, (d) means for retrieving information, which meets at least part of the conditions inputted by means (c), from the information stored in the means (b), and (e) means for transmitting the information, which is obtained as a result of retrieval performed by the means (d), to the terminal of the discharge source A, to which the information is presented, and/or to the terminal of the user office, from which retrieval conditions are inputted.

The spent sulfuric acid information management unit connected to the terminal of the discharge source A and to the terminal of the user office C through the network. The spent sulfuric acid information management unit has (a) means for receiving information on spent sulfuric acid, which is transmitted from the terminal of the discharge source A, (b) means for storing the information on the spent sulfuric acid, (c) means for receiving conditions, which are transmitted from the terminal of the user office C and concern spent sulfuric acid that the user office C wishes to be supplied with, (d) means for retrieving information, which meets at least part of the conditions inputted by means (c), from the information stored in the means (b), and (e) means for transmitting the information, which is obtained as a result of retrieval performed by the means (d), to the terminal of the discharge source A, to which the information is presented, and/or to the terminal of the user office, from which retrieval conditions are inputted.

The network may be constituted by either a wireless system or a wired system. For example, the Internet, a network constituted by a LAN, and a network connected thereto through leased lines.

The information on spent sulfuric acid, which is transmitted from the terminal of the discharge source A, is not particularly limited, but the information concerns, for example, an amount of spent sulfuric acid discharged, the presence/absence of measurement of the concentration of spent sulfuric acid, a result of measurement when concentration measurement is performed, the possibility of concentration adjustment of spent sulfuric acid, (for instance, a kind or a content of) the additional ingredient contained in spent sulfuric acid, or a delivery price.

The system according to the invention may have authentication means for authenticating a discharge source A when information on sent sulfuric acid is inputted from the terminal of the discharge source A. Further, items, such as a name and an address, which are little changed, and information concerning spent sulfuric acid, which has ever been inputted, may automatically be displayed according to user information preliminarily registered corresponding to a login ID and a password.

The conditions, which are transmitted from the terminal of the user office C and concern spent sulfuric acid that the user office C wishes to be supplied with, are not particularly limited. The conditions are, for example, an amount of spent sulfuric acid to be supplied, the necessity for performing measurement of the concentration of spent sulfuric acid, a desired concentration, the necessity for performing concentration adjustment on spent sulfuric acid, (for instance, a kind or a content of) the additional ingredient contained in spent sulfuric acid, or a desired purchase price.

The system according to the invention may have authentication means for authenticating the user office C when the conditions, which are inputted from the terminal of the user office C and concern spent sulfuric acid that the user office C wishes to be supplied with. Further, items, such as a name and an address, which are little changed, and information concerning spent sulfuric acid, which has ever been inputted, may automatically be displayed according to user information preliminarily registered corresponding to a login ID and a password.

Means for retrieving information in the system according to the invention may retrieve not only information, which meets all the conditions received by the means (c), but information, which meets at least part of the conditions inputted by the means (c), from the information stored in the means (b). Then, the retrieved information is transmitted to the terminal of the user office C from which the conditions are inputted. At that time, information concerning (for instance, the address and the name of) the discharge source A, to which the retrieved information is presented, may be transmitted thereto. Furthermore, information concerning (for example, the address and the name of) the user office C or/and the conditions, which are transmitted from the terminal of the user office C and concern spent sulfuric acid that the user office C wishes to be supplied with, may be transmitted to the discharge source A, to which the retrieved information is presented.

Preferably, the system according to the invention further comprises (f) means for storing information on the carrier unit B, and (g) means for selecting the carrier unit B according to at least one condition selected from locations of the discharge source A and the user office C, an amount of spent sulfuric acid to be transported, and the necessity for measurement and adjustment of the concentration of spent sulfuric acid. When the carrier unit B is selected, a condition other than the conditions, for example, the transportation cost, the structure and the characteristics of the material of the carrier unit B may be added. Incidentally, the "information on the carrier unit B" is not particularly limited. The "information on the carrier unit B" is, for example, a control station for the carrier unit B, an amount of spent sulfuric acid, which can be transported at a time, whether or not a facility for concentration measurement or concentration adjustment the carrier unit B has, and whether or not the carrier unit B has a special structure and a special material, and the properties of the special structure and the special material when the carrier unit B has a special structure or a special material.

Further, in the system according to the invention, more preferably, the spent sulfuric acid information management unit is connected to terminals of managers of the carrier units B through the network and has (h) means for transmitting information on transportation of spent sulfuric acid to the terminal of the manager of the selected carrier unit B. Information on the name and the address of each of the discharge source A and the user office C, an amount of spent sulfuric acid to be transported, the necessity for concentration measurement and concentration adjustment of spent sulfuric acid, transportation cost, transportation date and time, and properties of the structure and the material of the carrier unit B are cited as exemplifying the "information on transportation of spent sulfuric acid". Further, the "manager of the carrier unit B" is not particularly limited. Any person may be employed as the manager, as long as he manages the carrier unit B. Usually, an owner of the carrier unit B is cited as the "manager of the carrier unit B", though the "manager of the carrier unit B" is not limited to him.

The invention provides a computer-readable recording medium for recording a program for causing a computer to perform (a) the function of receiving information on spent sulfuric acid, which is transmitted from the terminal of the discharge source A, (b) the function of storing the information on the spent sulfuric acid, (c) the function of receiving conditions, which are transmitted from the terminal of the user office C and concern spent sulfuric acid that the user office C wishes to be supplied with, (d) the function of retrieving information, which meets at least part of the conditions inputted by performing the function (c), from the information stored by performing the function (b), and (e) the function of transmitting the information, which is obtained as a result of retrieval performed by performing the function (d), to the terminal of the discharge source A, to which the information is presented, and/or to the terminal of the user office, from which retrieval conditions are inputted.

Preferably, the recording medium according to the invention further records thereon a program for causing the computer to perform (h) the function of transmitting information on transportation of spent sulfuric acid to the terminal of the manager of the selected carrier unit B.

The program can be provided to users by preliminarily being installed into a hard disk and a semiconductor memory, which serve as a recording medium incorporated into the spent-sulfuric-acid information management unit according to the invention.

Furthermore, the program can tentatively or permanently be stored in recording media, such as a floppy (a registered trade mark) disk, a CD-ROM (Compact Disk-Read Only Memory), an MO (Magneto Optical) disk, a DVD (Digital Versatile Disc), a magnetic disk, and a semiconductor memory, and also can be provided as package software.

Furthermore, the program can be transferred to the spent sulfuric acid information management unit according to the invention from a downloading site by wireless through a satellite. Alternatively, the program is transferred by wire or wireless through a network, such as a local area network, and the Internet, to the spent sulfuric acid information management unit according to the invention, wherein the program is stored in an incorporated hard disk.

A recording medium referred to in the present specification is a broad concept including all of these media. Further, in the present specification, the functions describing the program provided in a recording medium may be performed chronologically in the order of description thereof, or may be performed in parallel or individually even when not performed chronologically.

In accordance with a method for recycling spent sulfuric acid according to the invention, at least at one of the discharge source office A, the carrier unit B, and the user office C, measurement of concentration of spent sulfuric acid and/or concentration adjustment of the spent sulfuric acid is performed by being mixed with at least one of hydrogen peroxide solution and water. Further, preferably, the concentration adjustment is performed according to a result of measurement of the concentration of spent sulfuric acid waste liquid, and the concentration of the sulfuric acid waste liquid is measured after the concentration adjustment is performed.

Means for measuring the concentration of sulfuric acid waste liquid or of sulfuric acid waste liquid mixed with at least one of hydrogen peroxide solution and water to thereby perform concentration adjustment is not particularly performed. However, the following means are cited. That is, at least one kind of means for measuring a refractive index, means for performing neutralization titration, means for measuring moisture content (according to a Karl Fischer's method, or what is called an evaporated residue method), means for measuring ultrasonic waves, means for measuring absorbance, means for measuring specific gravity (or density), means for measuring viscosity, means for measuring pH, and means for performing potentiometric titration is used, so that the concentration of spent sulfuric acid can be measured. Among these means, from the viewpoint of measurement speed and accuracy, and the price and size of a measuring instrument, and handling ability, the means for measuring a refractive index, the means for measuring specific gravity, the means for measuring pH, the means for measuring ultrasonic waves, and the means for measuring absorbance are more preferable. The above-mentioned concentration measurement may be performed at any one of the discharge source A, from which spent sulfuric acid is discharged, the carrier unit B transporting the spent sulfuric acid, and the user office C utilizing the spent sulfuric acid, alternatively, at two or more of the discharge source, the carrier unit, and the user office. A judgment index for judging whether or not concentration adjustment is needed is obtained by performing the concentration measurement in this way. When concentration adjustment is performed, an index for determining a mixing weight ratio when the sulfuric acid waste liquid is mixed with hydrogen peroxide solution and/or water is obtained.

The invention aims at enhancing the added value of the sulfuric aid waste liquid by mixing the spent sulfuric acid waste liquid with at least one of hydrogen peroxide solution and water. There is no particular limit to the order of mixing sulfuric acid waste liquid with hydrogen peroxide solution and/or water, and to a method of adjusting the concentration of spent sulfuric acid waste liquid to a predetermined value. Methods of adjusting the concentration of spent sulfuric acid waste liquid to a predetermined value are a method of adding a constant amount (per volume or per weight) of hydrogen peroxide solution and/or water to spent sulfuric acid waste liquid, and a method of adding a predetermined amount (per volume or weight) of hydrogen peroxide solution and/or water to spent sulfuric acid waste liquid according to a result of the measurement of the concentration. From the viewpoint of quality control, the latter method is more preferable. Further, regarding the order of mixing, from the viewpoint of safety, it is more preferable to add sulfuric acid waste liquid to hydrogen peroxide solution or water. Incidentally, in the case where according to a result of the measurement of the concentration, there is the necessity for increasing the concentration of sulfuric acid waste liquid, sulfuric anhydride or fuming sulfuric acid may be added thereto. Further, preferably, the mixing weight ratio is determined so as to adjust the concentration to a value needed at the user office. The hydrogen peroxide solution to be used for the concentration adjustment is not particularly limited, as long as the hydrogen peroxide solution is oxidative. The quality grade of the hydrogen peroxide solution may be adjusted to that required at the user office. Thus, the quality grade of the hydrogen peroxide solution may be either a low level grade for industrial use, or may be a high grade for reagent or electronic industry use.

The above-mentioned concentration adjustment by the addition of hydrogen peroxide and/or water (if necessary, concentrated sulfuric acid, sulfuric anhydride or fuming sulfuric acid may be added) may be performed at any one of the discharge source A, the carrier unit B, and the user office C, alternatively, at two or more of the discharge source, the carrier unit, and the user office.

The concentration measurement and the concentration adjustment may be performed either at the same place or at different places. In the case that the concentration measurement and the concentration adjustment are performed at the same place, a result of the concentration measurement is directly sent to a concentration adjustment apparatus (sulfuric acid waste liquid tank, concentration adjustment liquid, a concentration adjustment liquid storing tank, an adjustment liquid supply pump, a blending tank, a concentration measuring apparatus provided in the blending tank and so forth) in the form of a signal. Thus, the concentration can automatically be adjusted to a predetermined value. On the other hand, in the case that the concentration measurement and the concentration adjustment are performed at different places, a result of the concentration adjustment can be transmitted to the next step by various means, such as orality, telephones, mails, and the Internet. It is judged at a place, to which the result of the measurement is transmitted, according to the transmitted result whether spent sulfuric acid is used without change, or the concentration adjustment is performed. When the concentration adjustment is performed, the concentration adjustment liquid is added in such a way as to obtain a desired concentration, as above-mentioned. Incidentally, in the concentration adjustment tank, the concentration measuring apparatus may be installed so as to check whether the concentration of the spent sulfuric acid reaches a predetermined value after the concentration adjustment liquid is added thereto.

The above-mentioned concentration adjustment by the addition of hydrogen peroxide and/or water (if necessary, concentrated sulfuric acid, sulfuric anhydride or fuming sulfuric acid may be added) to sulfuric acid waste liquid may be performed at any one of the discharge source A, the carrier unit B, and the user office C, alternatively, at two or more of the discharge source, t a carrier unit, and the user office. However, preferably, the system has a concentration adjustment apparatus (sulfuric acid waste liquid tank, concentration adjustment liquid, a concentration adjustment liquid storing tank, an adjustment liquid supply pump, a blending tank, a concentration measuring apparatus provided in the blending tank and so forth). The concentration adjustment apparatus is not particularly limited. However, in the case where concentration adjustment apparatus is performed at the office A or C, preferably, the concentration adjustment apparatus is of the installation type. In the case where concentration adjustment apparatus is performed at the carrier unit B, preferably, the concentration adjustment apparatus is a tank of a tank truck. The blending tank may be any tank, as long as this tank is enabled to tentatively store sulfuric acid waste liquid having undergone the concentration adjustment, and to show corrosion-resistance against sulfuric acid and hydrogen peroxide solution. Preferably, for instance, quartz glass is used as the material of such a blending tank. Further, preferably, the blending tank has a waste liquid tank for temporarily storing spent sulfuric acid waste liquid so as to supply spent sulfuric acid waste liquid, hydrogen peroxide solution, and water thereto, a concentration adjustment liquid storing tank for storing concentration adjustment liquid, such as hydrogen peroxide solution and water, and a adjustment liquid supply pump for supplying such liquid thereto. Any material may be used as the material of each of the waste liquid tank, the concentration adjustment liquid storing tank, and the adjustment liquid supply tank, as long as the material shows corrosion-resistance against sulfuric acid and hydrogen peroxide solution, similarly as the material of the blending tank. Further, a tank, such as a rotary pump and a diaphragm pump, which are adapted to feed fluid due to a pressure difference, may be used as the adjustment liquid supply pump.

According to the invention, an additional treatment other than the measurement and/or the adjustment of the concentration of the spent sulfuric acid may be performed at least at one of the discharge source A, the carrier unit B, and the user office C. The additional treatment, which will be described in detail below, is, for example, a treatment of concentrating sulfuric acid contained in the spent sulfuric acid, a treatment of removing ingredients other than sulfuric acid, which are contained in the spent sulfuric acid, or a treatment of adding another ingredient other than the sulfuric acid, which is contained in the spent sulfuric acid, thereto.

The treatment of removing ingredients other than sulfuric acid contained in the spent sulfuric acid is cited as exemplifying the additional treatment. Specifically, spent sulfuric acid discharged in the technical field of metal plating frequently contains metal ions. Thus, a treatment of eliminating such metal ions can be cited as exemplifying the treatment of removing ingredients other than sulfuric acid. A treatment of using anion-exchange membrane and separating metal ions from a solution, which contains acid and metal, by utilizing a concentration difference therebetween as a driving force to thereby that is, what is called diffusion dialysis is cited as exemplifying the treatment of eliminating the metal ions (see Japanese Patent Application Publication Laid-Open No. 08-000966). Many documents and patents concerning membrane for performing diffusion dialysis on acid are reported. Anion-exchange membrane obtained by amination of (or introduction of quaternary-pyridinium groups to) chlormethyl-styrene (or vinyl pyridine)-divinyl-benzene copolymer is most practical and useful.

Treatments of removing excessive hydrogen peroxide solution from spent sulfuric acid containing the hydrogen peroxide solution so as to obtain a predetermined concentration of a hydrogen peroxide solution are cited as exemplifying the treatment of removing ingredients other than sulfuric acid contained in the spent sulfuric acid. More specifically, a treatment of decomposing hydrogen peroxide by simultaneously supplying hydrogen to a hydrogen peroxide decomposing catalyst (see Japanese Patent Application Publication Laid-Open No. 61-186208), and a treatment of decomposing hydrogen peroxide by letting waste liquid, whose temperature is raised, through a carbonaceous material (see Japanese Patent Application Publication Laid-Open No. 5-345188) are cited. Moreover, a treatment of introducing sulfurous acid into spent sulfuric acid, which contains hydrogen peroxide solution, and causing the hydrogen peroxide and the sulfurous acid to react with each other thereby to decompose hydrogen peroxide and to produce sulfuric acid, and preventing sulfurous acid by detecting the sulfurous acid from excessively being added thereto, and then eliminating residual sulfurous acid by aerating the spent sulfuric acid after the introduction of the sulfurous acid is stopped (see Japanese Patent Application Publication Laid-Open No. 9-315806).

The added value of spent sulfuric acid, which has hitherto been not effectively utilized, or which has been sold at low price, can be dramatically increased (as that of a valuable resource) by using the above-mentioned method. There are three modes of selling spent sulfuric acid are a case that a result of measuring the concentration is transmitted to a purchaser without changing the spent sulfuric acid, a case that the spent sulfuric acid, to which concentration adjustment liquid, such as hydrogen peroxide solution and/or water, is added (incidentally, the concentration thereof is indefinite after the concentration adjustment liquid is added), is sold, and a case that the spent sulfuric acid, to which concentration adjustment liquid is added, is sold by adjusting the concentration thereof to a predetermined value (incidentally, the value of the concentration is checked). When the spent sulfuric acid is soled, volume (or capacity) or weight thereof may be employed as a basis for sales. Alternatively, the spent sulfuric acid may be sold according to a result of the concentration measurement by using the content of pure sulfuric acid as the basis for sales. When the spent sulfuric acid is sold without change, that is, without performing the concentration adjustment, the concentration of the spent sulfuric acid varies at the discharge source. Therefore, it is more rational (or quantitative) to sell the spent sulfuric acid on the basis of the pure sulfuric acid content.

A system for recycling spent sulfuric acid according to the invention can repeat the treatment a plurality of times. That is, sulfuric acid recycled by the system for recycling spent sulfuric acid according to the invention may be provided thereto again. More specifically, circulation of the recycling, which is represented by the next expression: Discharge Source A→Carrier unit B→User Office C (=Discharge Source A'→Carrier unit B'→User Office C')n (in the expression, "n" designates a natural number, preferably, a natural number ranging from 1 to 7, and incidentally, in the case that "n" is equal to or larger than 2, A', B', and C', which correspond to a different value of "n", may be either the same as or differ from A, B, and C, respectively.

The system for recycling spent sulfuric acid according to the invention may have the following system mode. That is, the system cited herein has a spent sulfuric acid information management unit connected to a terminal of the discharge source A, and a terminal of the user office C, through a network, for example, the Internet and a LAN. The system comprises (a) means for inputting information on spent sulfuric acid, (b) means for storing the information on the spent sulfuric acid, (c) means for inputting conditions concerning spent sulfuric acid to be supplied, (d) means for retrieving information, which meets at least part of the conditions inputted by means (c), from the information stored in the means (b), and (e) means for transmitting the information, which is obtained as a result of retrieval performed by the means (d), to the terminal of the discharge source A, to which the information is presented, and/or to the terminal of the user office, from which retrieval conditions are inputted. Furthermore, the spent sulfuric acid management unit is also connected to a terminal of the carrier unit B through a network, and has (f) means for transmitting to the terminal of the selected carrier unit B information concerning transportation of spent sulfuric acid waste liquid.

<Embodiments>

The invention is specifically described hereinbelow by the embodiments, however, the invention is not limited thereto.

Figure 2:
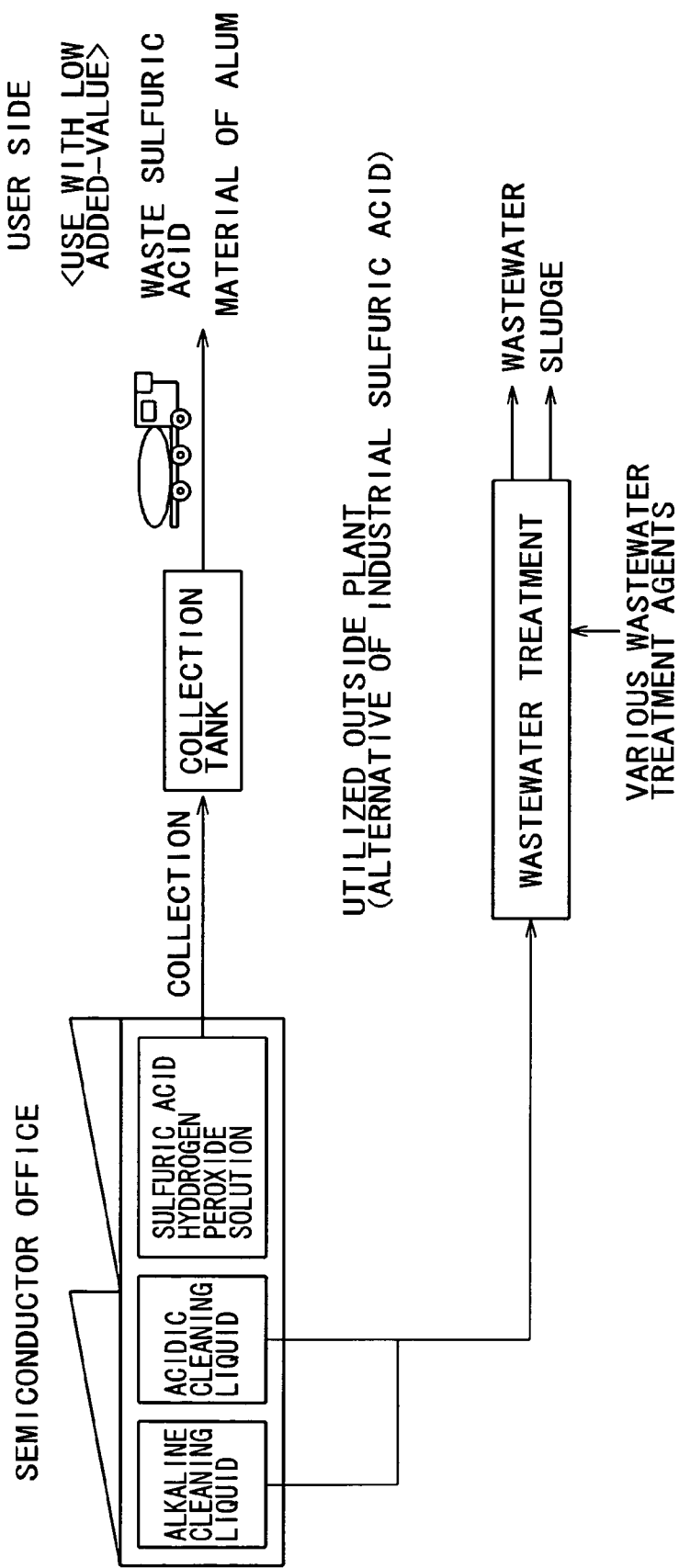
FIG. 2 is a view illustrating a mode in a conventional method of reusing spent sulfuric acid by refinement and recovery.

For comparison, a flow of a conventional treatment of spent sulfuric acid is illustrated in FIGS. 1A, 1B, 2, and 3. For example, spent sulfuric acid discharged from a semiconductor office and a plant is sometimes subjected to a wastewater treatment together with other alkaline/acidic leaning liquid, as shown in FIG. 1A. Then, acidic or alkaline neutralizer and various wastewater treatment agents are applied thereto. Thereafter, the spent sulfuric acid changed into wastewater and sludge. Further, as illustrated in FIG. 1B, sometimes, only waste sulfuric waste liquid is collected. The collected liquid is utilized as a neutralizer (or acid), and then subjected to a wastewater treatment. Furthermore, as illustrated in FIG. 2, spent sulfuric acid waste liquid is sometimes taken over to a specialized processor, and subjected to refinement and recovery. More specifically, after collected, spent sulfuric acid waste liquid is transported a long distance, and delivered to a user. Then, the spent sulfuric acid waste liquid is subjected to refinement and recovery treatments in a large-scale plant. Thus, the spent sulfuric acid waste liquid is used as materials of waste sulfuric acid and alum. For example, as illustrated in FIG. 3(c), the spent sulfuric acid is sometimes subjected to a refinement treatment in a large-scale plant, and subsequently, transported a long distance and delivered to a user. As illustrated in FIG. 3(d), spent sulfuric acid is sometimes subjected to a mixing treatment in a large-scale plant. After recycled, the recycled sulfuric acid is transported a long distance, and delivered to a user. Furthermore, as illustrated in FIG. 3(e), spent sulfuric acid is sometimes discarded after subjected to a wastewater treatment in a large-scale plant.

Figure 4A:
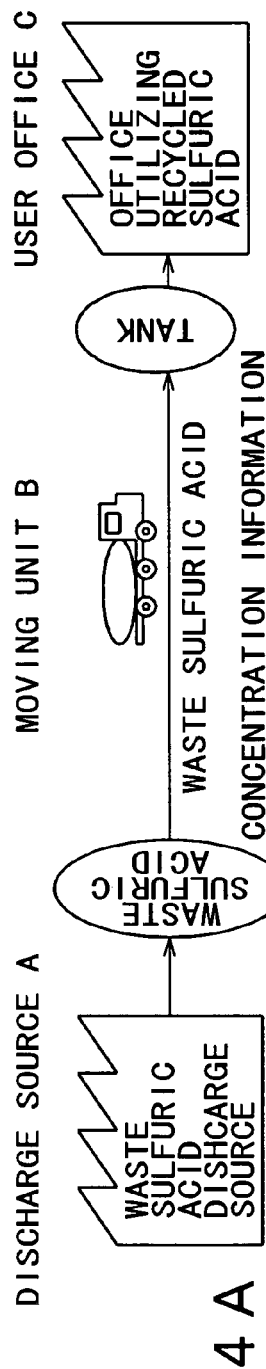
FIGS. 4A to 4C are views each illustrating a mode of a system for recycling spent sulfuric acid according to the invention.
Figure 4B:
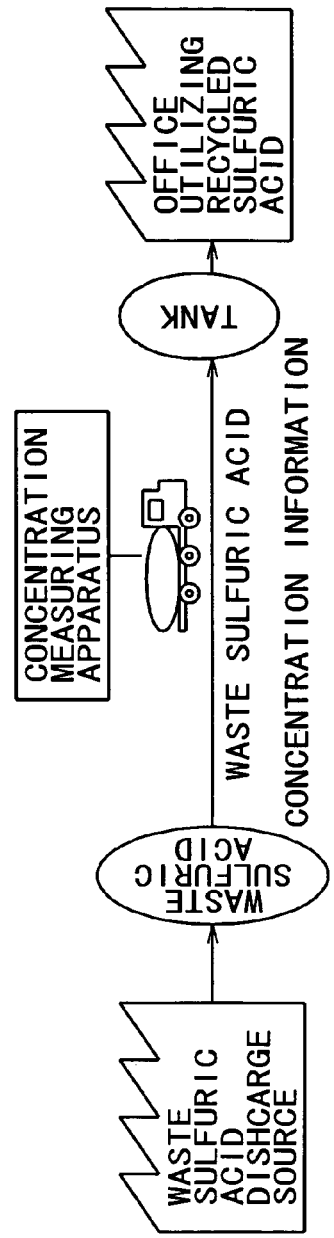
Figure 4C:
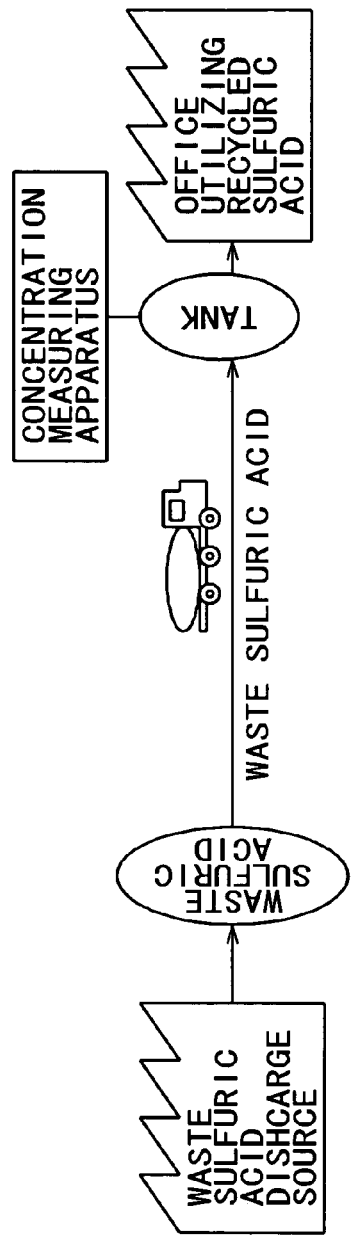

FIGS. 4A to 4C illustrate a mode of a system for recycling spent sulfuric acid according to the invention. In this mode, measurement of the concentration of spent sulfuric acid is performed at one of a discharge source A (in a case illustrated in FIG. 4A), a carrier unit B (in a case illustrated in FIG. 4B), and a user office C (in a case illustrated in FIG. 4C). In the cases respectively illustrated in FIGS. 4A and 4B, information representing a result of the measurement of the concentration is transmitted to the user office C.

FIG. 5 illustrates another mode of the system for illustrating spent sulfuric acid according to the invention. In this embodiment, the concentration of spent sulfuric acid is adjusted according to a result of measurement of spent sulfuric acid. More specifically, as illustrated in (A) of FIG. 5, the measurement of the concentration of spent sulfuric acid is performed at the discharge source A. Then, adjustment of the concentration of spent sulfuric acid is performed according to a result of the measurement of the concentration. Subsequently, recycled sulfuric acid, whose concentration has been adjusted, is provided to a user C by a carrier unit B. In (C) of FIG. 5, there is shown a case that concentration measurement and concentration adjustment based thereon are performed by the user C instead of the discharge source A. Further, measurement of the concentration of spent sulfuric acid is conducted at the carrier unit B. A result of the measurement is transmitted to the user C. The user C may perform the concentration adjustment according to a result of the measurement thereof transmitted thereto (see (B) of FIG. 5).

A more specific mode of the system for recycling spent sulfuric acid according to the invention is illustrated in FIG.

6. In this mode, spent sulfuric acid, which is collected from a semiconductor plant and contains a hydrogen peroxide solution, is recycled as a mixture solution of sulfuric acid and hydrogen peroxide solution at a cathode-ray tube plant. More specifically, at the semiconductor plant, spent sulfuric acid containing hydrogen peroxide solution (designated as sulfuric acid hydrogen peroxide solution wasted liquid in FIG. 6, and hereunder abbreviated as "sulfuric acid hydrogen peroxide solution waste liquid") is collected and stored in a sulfuric acid hydrogen peroxide solution waste liquid tank. A tank truck is used as the carrier unit B. Thus, the sulfuric acid hydrogen peroxide solution waste liquid is transported to the cathode-ray tube circuit board plant. At that time, an owner of the tank truck may purchase the sulfuric acid hydrogen peroxide solution waste liquid from the semiconductor plant and sells the sulfuric acid hydrogen peroxide solution waste liquid to the cathode-ray tube circuit board plant in addition to transportation of the sulfuric acid hydrogen peroxide solution waste liquid. At the cathode-ray tube circuit board plant, the concentration of the transported sulfuric acid waste liquid is measured. Then, hydrogen peroxide solution and water are added thereto when needed. Thus, sulfuric acid containing hydrogen peroxide solution at a predetermined mixing ratio is produced. Thereafter, this sulfuric acid is used for peeling photoresist film and used as peeling liquid for copper foils. Incidentally, a hydrogen peroxide solution used for concentration adjustment may be a used hydrogen peroxide solution.

Figure 6:
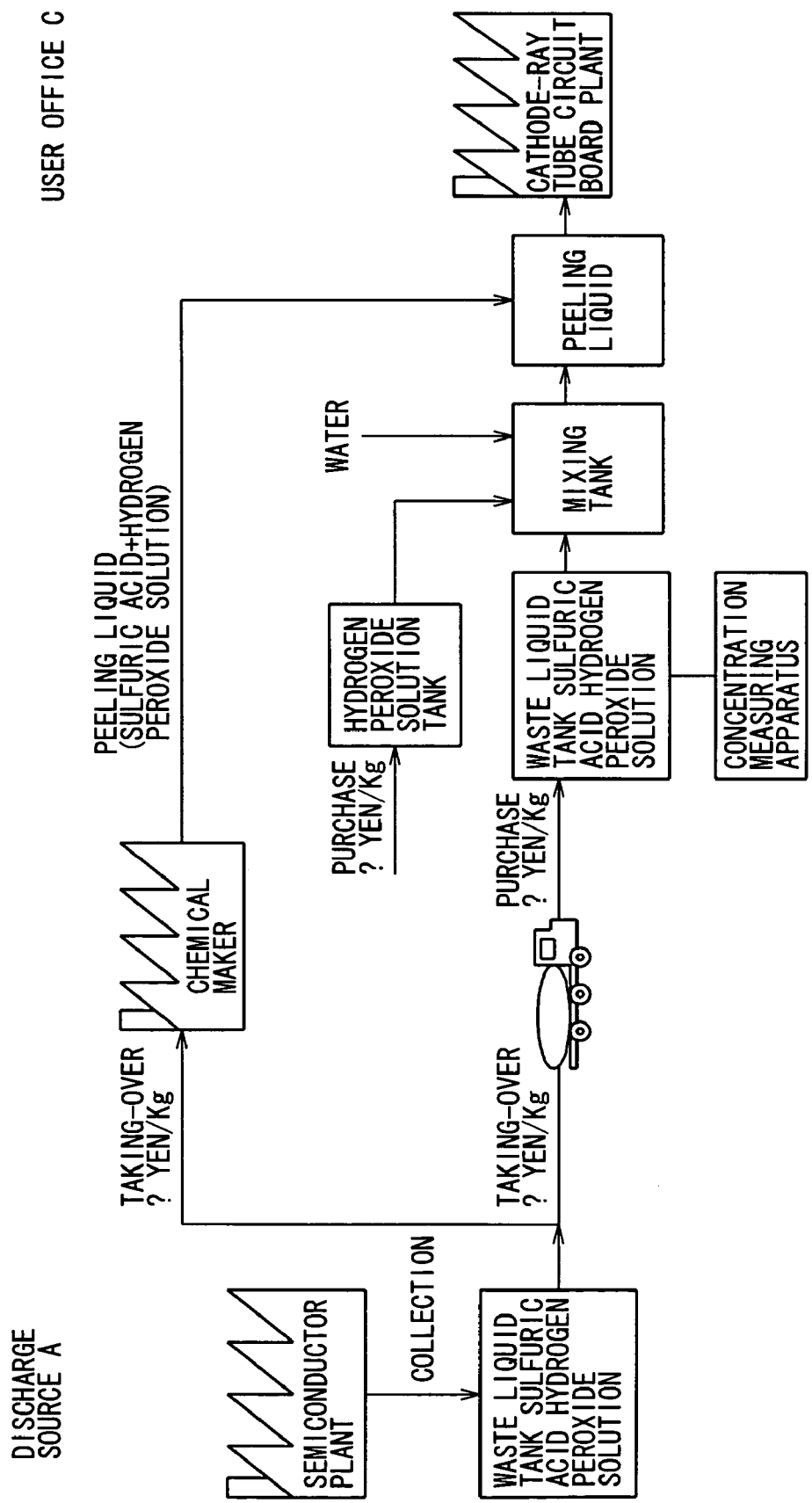
FIG. 6 is a view illustrating a more practical mode of the system for recycling spent sulfuric acid according to the invention.

Further, FIG. 6 illustrates a case where the system for recycling spent sulfuric acid according to the invention is successively and repeatedly used twice. That is, sulfuric acid hydrogen peroxide waste liquid discharged at the semiconductor plant is recycled at a chemical plant according to the recycling system according to the invention. Moreover, sulfuric acid hydrogen peroxide solution waste liquid discharged at the chemical plant is recycled at the cathode-ray tube circuit board plant. Incidentally, in FIG. 6, details of the steps are not illustrated.

Figure 7:
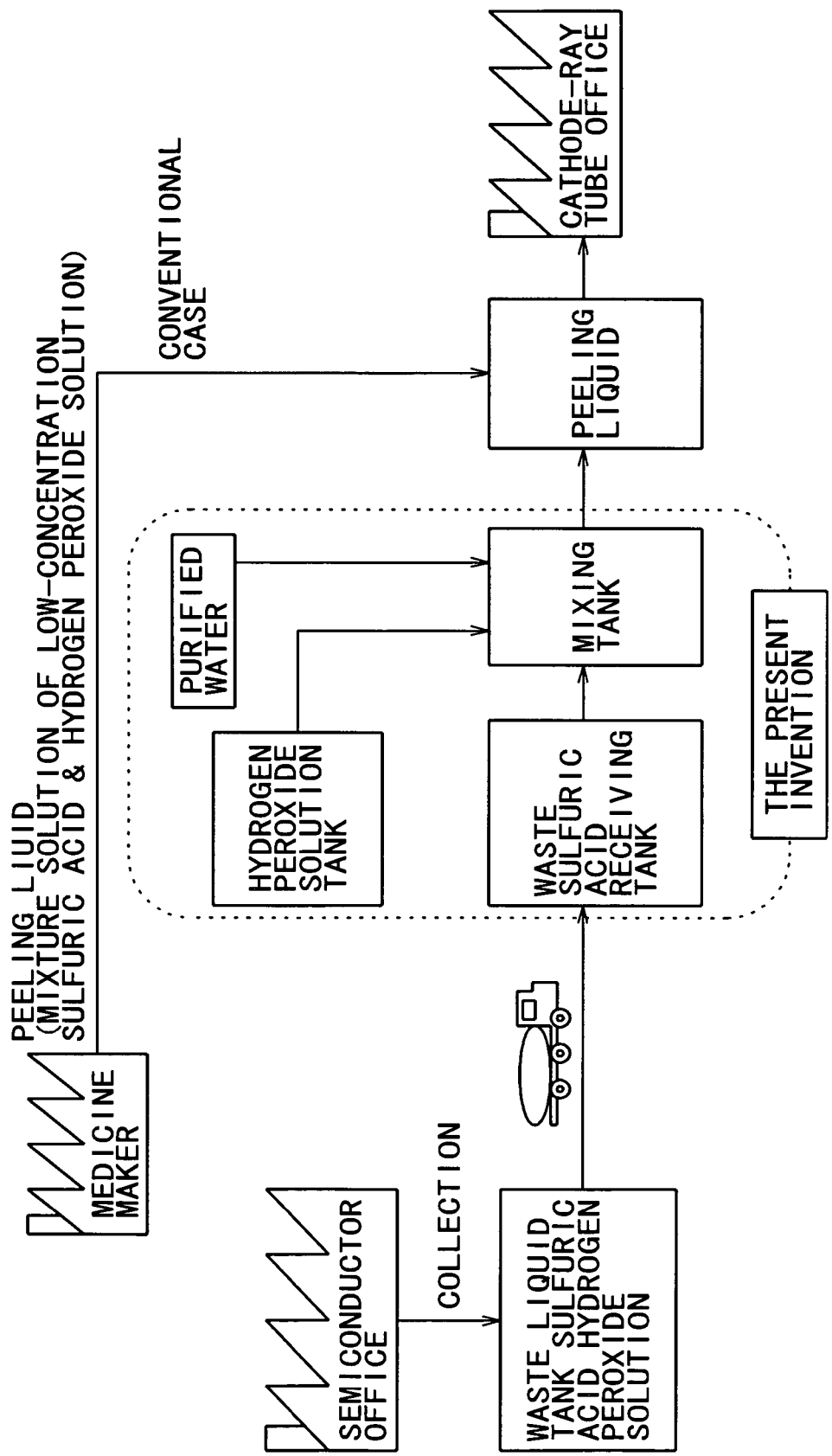
FIG. 7 is a view illustrating a mode of a method of recycling spent sulfuric acid according to the invention.

FIG. 7 illustrates a more specific mode of a method for recycling spent sulfuric acid. In this mode, spent sulfuric acid, which is collected from a semiconductor office or plant and contains hydrogen peroxide solution, is recycled and utilized at the cathode-ray tube manufacturing office or plant as peeling liquid for photoresist film. More specifically, at the semiconductor plant, spent sulfuric acid containing hydrogen peroxide solution (designated as sulfuric acid hydrogen peroxide solution wasted liquid in FIG. 7, and hereunder abbreviated as "sulfuric acid hydrogen peroxide solution waste liquid") is collected and stored in a sulfuric acid hydrogen peroxide solution waste liquid tank. A tank truck is used as the carrier unit B. Thus, the sulfuric acid hydrogen peroxide solution waste liquid is transported to the cathode-ray tube circuit board plant. At that time, an owner of the tank truck may purchase the sulfuric acid hydrogen peroxide solution waste liquid from the semiconductor plant and sells the sulfuric acid hydrogen peroxide solution waste liquid to the cathode-ray tube circuit board plant in addition to transportation of the sulfuric acid hydrogen peroxide solution waste liquid. At the cathode-ray tube circuit board plant, the concentration of the transported sulfuric acid waste liquid is measured. Then, one more of hydrogen peroxide solution and/or water is added thereto in such a way as to have a desired concentration. Thus, sulfuric acid containing a hydrogen peroxide solution at a predetermined mixing ratio is produced in a blending tank. Thereafter, this sulfuric acid is used for peeling photoresist film and used as peeling liquid for copper foils. Incidentally, a hydrogen peroxide solution used for concentration adjustment may be a used hydrogen peroxide solution.

The quality grade of recycled sulfuric acid obtained in this mode is equivalent to that of peeling liquid (low-concentration sulfuric acid hydrogen peroxide solution mixture liquid) hitherto purchased for peeling off photoresist film by the cathode-ray tube manufacturing office or plant from a medicine maker. This can contribute to effective utilization of spent sulfuric acid waste liquid by recycling thereof and to reduced manufacturing cost in the cathode-ray tube manufacturing office or plant.

FIGS. 8A to 8C illustrates another mode of the method for recycling spent sulfuric acid according to the invention. In this mode, adjustment of concentration of spent sulfuric acid by adding one or more of hydrogen peroxide solution and/or water according thereto is performed according to a result of measurement of concentration of spent sulfuric acid waste liquid. More specifically, as illustrated in FIG. 8A, the measurement of the concentration of spent sulfuric acid waste liquid is performed at the discharge source A. Then, adjustment of concentration of spent sulfuric acid by adding one or more of hydrogen peroxide solution and/or water according thereto is performed according to a result of the measurement. Subsequently, recycled sulfuric acid, whose concentration is adjusted, is provided to the user office C by using the carrier unit B. FIG. 8C illustrates a case that concentration measurement and concentration adjustment according thereto are performed by the user office C instead of the discharge source office A. Further, the following process may be performed. That is, measurement of the concentration of spent sulfuric acid is performed at the carrier unit B. A result of the measurement is transmitted to the user office C. The user office C may perform concentration adjustment by adding one or more of hydrogen peroxide solution and/or water according to a result of the measurement of the concentration (see FIG. 8B).

INDUSTRIAL APPLICABILITY

According to the invention, an added value of spent sulfuric acid discharged from a certain office is enhanced and effective utilization of the spent sulfuric acid is promoted by adding at least one of hydrogen peroxide and/or water to the spent sulfuric acid. Moreover, according to the invention, there is no particular necessity for a large office so as to enhance the added value of spent sulfuric acid. Thus, recycling thereof is almost not affected by the location. Consequently, the recycling of spent sulfuric acid is promoted. Cut-down of a wastewater treatment agent for treating spent sulfuric acid, and reduction of amounts of sludge and wastewater are enabled. Especially, in the case where a discharge source A and a user office C belong to the same company, the same group of companies, or the same group of affiliated companies, advantages of the invention are dominantly enhanced.

The invention claimed is:

1. A method for recycling sulfuric acid waste liquid which contains hydrogen peroxide, characterized in that spent sulfuric acid waste liquid containing hydrogen peroxide discharged/collected at a discharge source is utilized by being mixed with hydrogen peroxide solution and water.

2. The method for recycling sulfuric acid waste liquid according to claim 1, characterized in that a concentration of a metal ingredient contained in the spent sulfuric acid waste liquid is equal to or less than 10 ppb, and that a concentration of chloride contained in the spent sulfuric acid waste liquid is equal to or less than 0.1 ppm.

3. The method for recycling sulfuric acid waste liquid according to claim 1, characterized in that the spent sulfuric acid waste liquid discharged/collected at the discharge source is utilized at a user office C other than the discharge source.

4. The method for recycling sulfuric acid waste liquid according to claim 1, characterized in that the concentration of the spent sulfuric acid is adjusted according to a result of measuring thereof.

5. The method for recycling sulfuric acid waste liquid according to claim 1, characterized in that when the spent sulfuric acid discharged or collected at the discharge source is transported by a carrier unit and used at a user office, a concentration of the spent sulfuric acid is measured and/or adjusted at least at one of the discharge source, the carrier unit, and the user office to recycle only spent sulfuric acid having 50 to 98 Wt % in a concentration of the sulfuric acid.

6. Recycled sulfuric acid manufactured by using a method for recycling sulfuric acid waste liquid, characterized in that spent sulfuric acid waste liquid containing hydrogen peroxide discharged/collected at a discharge source is utilized by being mixed with hydrogen peroxide solution and water.

7. The recycled sulfuric acid according to claim 2, characterized in that a concentration of a metal ingredient contained in the spent sulfuric acid waste liquid is equal to or less than 10 ppb, and that a concentration of chloride contained in the spent sulfuric acid waste liquid is equal to or less than 0.1 ppm.

* * * * *